United States Patent [19]
Brody

[11] Patent Number: 4,523,781
[45] Date of Patent: Jun. 18, 1985

[54] GRIPPING AID FOR THE MANUALLY DISABLED

[76] Inventor: Hal Brody, 5366 Jackson Dr., La Mesa, Calif. 92041

[21] Appl. No.: 582,886

[22] Filed: Feb. 23, 1984

[51] Int. Cl.[3] .................... A47F 13/06; A47J 45/00

[52] U.S. Cl. .................... 294/1.1; 401/6; 623/65

[58] Field of Search .................... 294/1 R, 26, 25; 15/437, 443; 401/6, 7, 8, 48; 3/1, 12.8; 16/114 R, 118, 121, DIG. 19

[56] References Cited

U.S. PATENT DOCUMENTS

| | | | |
|---|---|---|---|
| 2,173,451 | 9/1939 | Lorber | 401/6 |
| 3,610,670 | 10/1971 | Keck | 294/1 R |
| 3,942,194 | 3/1976 | Winter | 401/8 |
| 4,386,448 | 6/1983 | Kohn | 401/6 |

*Primary Examiner*—James B. Marbert
*Attorney, Agent, or Firm*—Ralph S. Branscomb

[57] ABSTRACT

A semi-flexible gripping aid is provided whereby a person with a manual or digital disability, such as an arthritis victim, can grasp a large, semi-flexible body which in turn captures a thin instrument such as a knife or fork, pen or pencil, or toothbrush. The semi-flexible body in its preferred form is hinged to define two half shells which clamshell together around the handle of a knife or fork or the like, there being predefined channels along the meeting plane of the half shells in which the instrument is captured. For those having insufficient manual and digital dexterity to grip even the large body of the gripping aid, a strap is provided which passes behind the palm to secure the body to the hand, making the aid usable even though the hand is virtually totally immobilized, or is missing fingers.

16 Claims, 22 Drawing Figures

FIG. 2
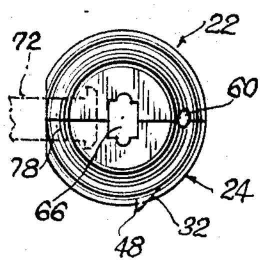
FIG. 1
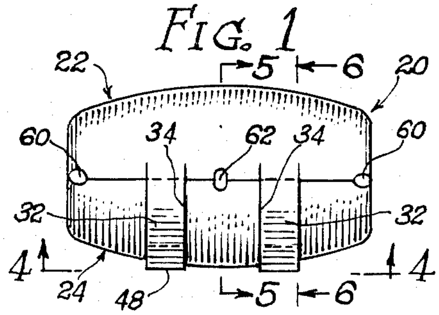
FIG. 3
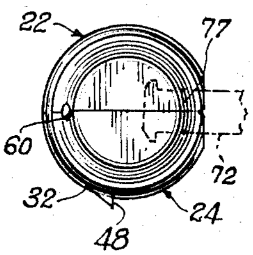
FIG. 4
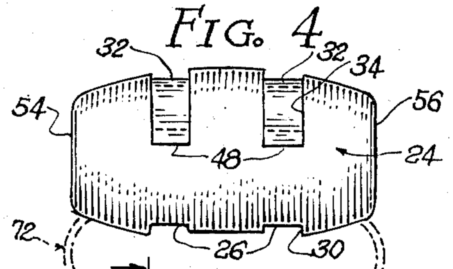
FIG. 5
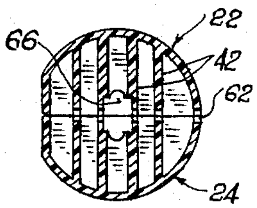
FIG. 6
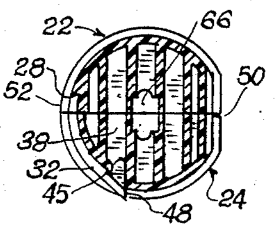
FIG. 7
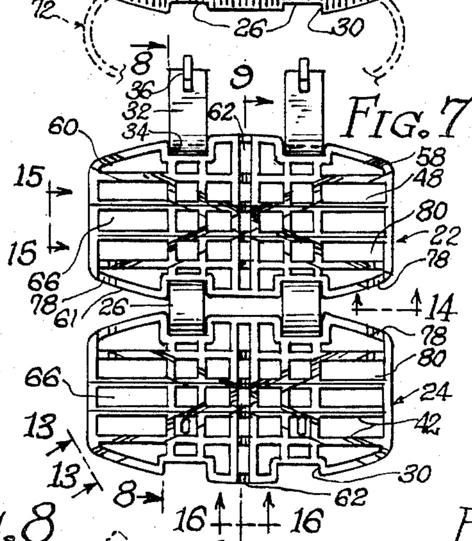
FIG. 14
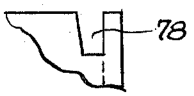
FIG. 16
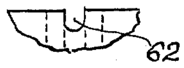
FIG. 15
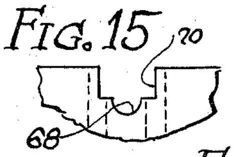
FIG. 13
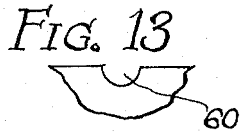
FIG. 8
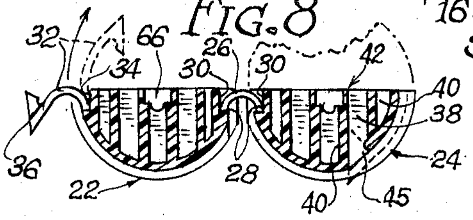
FIG. 9
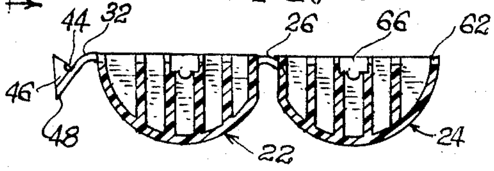
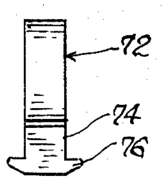
FIG. 10
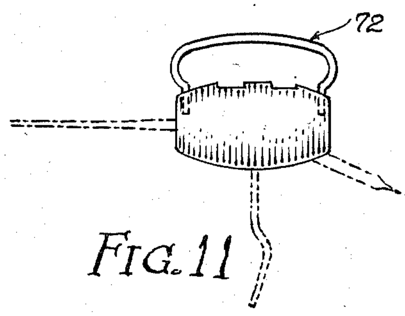
FIG. 11
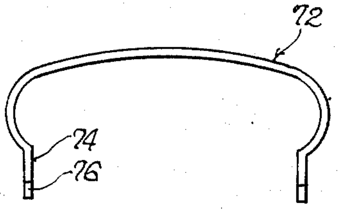
FIG. 12

GRIPPING AID FOR THE MANUALLY DISABLED

BACKGROUND OF THE INVENTION

Arthritis and related diseases are claiming a tremendous, and increasing, segment of the population. It is seemingly more common to find more young people with arthritis, a disease formerly considered restricted primarily to the elderly.

So widespread is this affliction that those suffering from it have gone beyond the traditional, approved forms of medication, which ordinarily comprises higher and higher doses of aspirin and compounds containing aspirin: increasingly these medicines are being promoted through advertising media for the arthritic. The millions of dollars spent in all branches of the media, and particularly on television, evidences the fact that enormous numbers of people suffer from this disease, and thus an enormous market exists for the massive doses of aspirin promoted for arthritics.

Beyond aspirin, millions of arthritics turn to the controversial DMSO, the industrial solvent apparently having powerful analgesic properties for arthritics. Although not approved by the FDA for use as a medication, nonetheless the pain and loss of self-esteem coupled with loss of bodily function suffered by arthritics has been enough to drive them to use DMSO despite the unknown, potentially devastating side effects.

In addition to DMSO, along the Mexican border of the United States thousands of people from the United States and Canada congregate every year to cross the border daily for the treatment of arthritis with injections and pills which are not approved in the United States, but which seem to give such relief to the recipients that they are willing to make this migration over several thousand miles, several times a year.

As the post-world War II baby boom children increase in age into the years characterized by the high incidences of arthritis, undoubtedly the problem and the suffering together with the demand for greater relief, will increase dramatically.

In addition to the suffering from pain, the psychological burden of arthritis can be tremendous. As the hands become increasingly paralyzed, the arthritic must rely increasingly on other people to perform the simplest of chores. In particular, the hands are used to grip so many small objects like pens and pencils, knives, forks and spoons, a tooth brush, and other objects, that the untreated arthritic may ordinarily become very demoralized. He or she suffers a blow to his or her self-esteem each time he faces the inability to perform one of these common, every day activities, which evidence the freedom and the ability of the individual to care for his own needs.

Thus, the psychological devastation of seeing one's body slowly become paralyzed and seeing oneself become an increasing burden on friends, relatives and possibly the state, is potentially more harmful than the pair itself. There is virtually nothing more painful in the long run than the chronic erosion of one's self-esteem. Active, self-sufficient people with high esteem can survive infections and operations, and major setbacks in life, much more readily than can dependent persons whose self-esteem has been regularly, and severely, eroded.

There is thus a need for anything which would help arthritics, not only to relieve the pain of their arthritis, but also to enable them to become as self-sufficient as possible in the execution of the daily chores which non-arthritics so take for granted, but which for arthritics become agonizing chores with demoralizing results. The ability to simply feed oneself or use the phone, can make the difference between being independent or institutionalized for millions of Americans.

Whereas to date there has been a tremendous financial emphasis on selling arthritics pain relievers, and in other fields of disability there has been tremendous economic and medical activity in providing artificial limbs, organs and a wide variety of other prosthetics, little or no effort has been directed toward the development of prosthetic and semi-prosthetic devices to assist arthritics and others with manual and digital disabilities, along with disabilities of their other joints, to accomplish those functions of which the arthritis has deprived them.

SUMMARY OF THE INVENTION

The present invention fulfills the above-stated need by enabling an arthritic, or other patient suffering loss of manual or digital dexterity, to hold a small object, such as a pen, pencil, fork or toothbrush without the assistance of a non-arthritic person. These small-diameter objects, designed to be easy to use by ordinary people, present a special problem for arthritics. Normal people can grip them with sufficient pressure to prevent their longitudinal movement through the hand in use. Many arthritics, however, cannot even close their fingers around such instruments much less grip them with sufficient force to make them usable.

The instant invention in effect expands the diameter of the object by utilizing a larger, palm-shaped body, preferably in the form of a hinged, semi-flexible clamshell, which can be clamshelled around the handle of a knife, fork, spoon, pen, pencil, toothbrush, or other object and then latched, so that the arthritic can grasp the larger body and manipulate it, and thus the instrument it grips, without having to grip the object directly. The necessity to apply a lot of finger pressure on a thin implement is completely eliminated.

The aid in its preferred form is formed from a single injection molding. Special strap hinges and latch straps are designed so that when the two half-shells are folded outwardly, the unit is in a position in which it can be molded without the use of any inserts or mandrells in the mold and no secondary manufacturing operations of any kind are required. The strap hinges, in contrast to the prevelant "living hinge", are long enough to provide a radius of curvature that will enable the hinge to last indefinitely without yielding and cracking as does the "living hinge".

The detent straps, which hold the half shells in position around the handle of an instrument, each have a nib at the end which snaps into an opening on the other half-shell. A crestlike projection at the end of the latch straps enables the arthritic to pop the detents out of engagement with the second half-shell with the palm of the other hand, or any other part of the body, or even a piece of furniture.

For the severely manually handicapped, a hand strap is used which passes around the palm of the hand and engages between the two half-shells of the body as it is closed. Thus, a person with no fingers, or with totally inoperative fingers, could still use the aid with the simple expedient of the hand strap.

BRIEF DESCRIPTION OF THE DRAWINGS

FIG. 1 is a front elevation view of the aid;

FIG. 2 is an elevation view of the left side of FIG. 1 showing the end of the aid which is on bottom in normal right hand use;

FIG. 3 is an elevation view from the right end of FIG. 1 showing the top of the aid in normal right hand use;

FIG. 4 is a side elevation view of the aid taken along line 4—4 of FIG. 1;

FIG. 5 is a section taken along line 5—5 of FIG. 1;

FIG. 6 is a section taken along line 6—6 of FIG. 1;

FIG. 7 is a plan view of the aid as it appears spread into its open mode;

FIG. 8 is a section taken through line 8—8 of FIG. 7 showing the latch strap in phantom as it would appear in locked position;

FIG. 9 is a section taken along line 9—9 of FIG. 7;

FIG. 10 is an end view of the palm strap;

FIG. 11 is a side view of the aid with the palm strap in position;

FIG. 12 is a side elevation view of the palm strap;

FIGS. 13-16 are elevation views illustrating the various channels cut into the body as seen along the appropriate lines indicated in FIG. 7; and, FIG. 17 shows the use of the aid with such instruments as fork or spoon.

DETAILED DESCRIPTION OF THE PREFERRED EMBODIMENT

Figure 17:
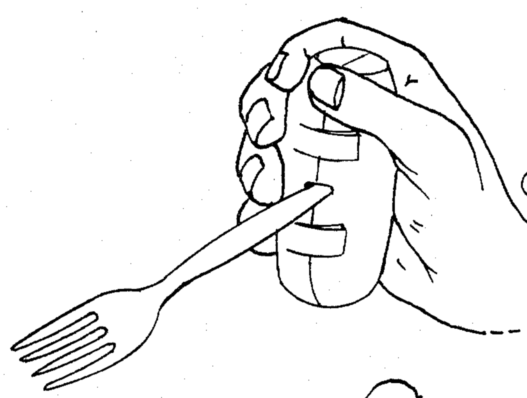

The basic unit is shown in FIG. 1, where it can be seen that the body 20 of the aid is somewhat barrel-shaped when the two half-shells are fastened together. The half-shells 22 and 24 are preferably hinged together and the hinge means preferably comprises a pair of hinge straps 26, the action of which can best be understood by reference to FIGS. 7, 8 and 9. The hinge straps are fastened to the respective half-shells at 28, representing points removed from the junction line between the two rear edges of the body when it is clamshelled together. That is, rather than the hinge being right one the meeting plane between the two half-shells, the hinge straps are elongated and fastened at points offset from the meeting plane so that when the half shells are opened, the straps have a relatively large radius of curvature as can be seen in FIGS. 8 and 9. This differs from the "living hinge", in which a very short piece of plastic is forced to double back on itself, causing it to fracture and separate after a certain number of bendings. The instant strap hinges, by way of comparison, should last indefinitely, because the material is not forced to yield, but only flex within its stress limits.

The straps are so positioned that they fall within recesses 30 defined in the body. They are also designed so that they can be produced as a unitary part of the two half-shells by a single molding operation. With reference to FIG. 8, it can be seen that the lower portion of a mold can be withdrawn directly beneath the hinge straps, molding these straps into the shapes shown in FIG. 8.

The latch straps 32 are somewhat similar in construction to the hinge straps 26. These straps also lie in recesses 34 so that they do not project beyond the projected surface of the body. As can be seen in FIG. 8 once more, these straps can be molded in the positions shown, with the top and bottom mold elements being retractable without the use of further inserts or molds. The straps would thus be somewhat reverse-bent, as shown in FIG. 8.

The straps each mount on its end a nib 36 which fits into an opening 38 on the other half-shell as shown best in phantom in FIG. 8. The opening permits the nib to pass between two adjacent ribs 40 of the reticulated rib pattern 42, there being a notch 44 cut in the neck of the nib so that it engages a bump or half round 45 molded on the body. The flat head 46 of the nib, coupled with the notch 44, cause the nib to remain securely in the opening until the crest or projection 48 is forced back upon the latch strap, by the palm of the other hand, the edge of a furniture piece, or other convenient body part or object. Unless the projection 48 is pushed, tension on the latch straps in the circumferential direction will not release the latch detents, as the notch 44 of the nibs simply press against the bump 45 even harder, while the flat head 46 pressing against the rib 40 maintains the angular location of nib 36. Thus, by the use of this specialized nib detent, the advantages of non-slip latching, and ease of unlatching, are combined to provide a coupling that is ideal for the manually limited users of the unit.

The interiors of the half-shells are molded in a reticulated rib pattern 42 as best shown in FIG. 7. This pattern reduces the weight of the unit, and, with the semi-flexible ribs, enables it to yield to securely grip various instruments. The reticulated rib structure is modified to define several channels which pass across the junction plane of the two half-shells. For purposes of identifying orientations, the back of the body will be defined at 50, on the hinge side, with the front being the opposite side where the latches are at 52. The top of the barrel at 56 is the end of the aid which would be up in normal, right-handed use, and 54 represents the bottom end.

Figure 19:
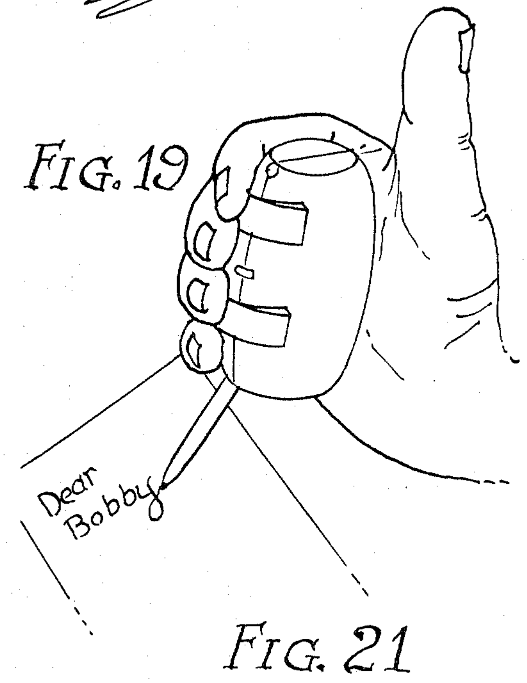
FIG. 19 shows the aid holding a writing instrument. Also it shows the aid's usability when only the fingers are abailable for holding.
Figure 20:
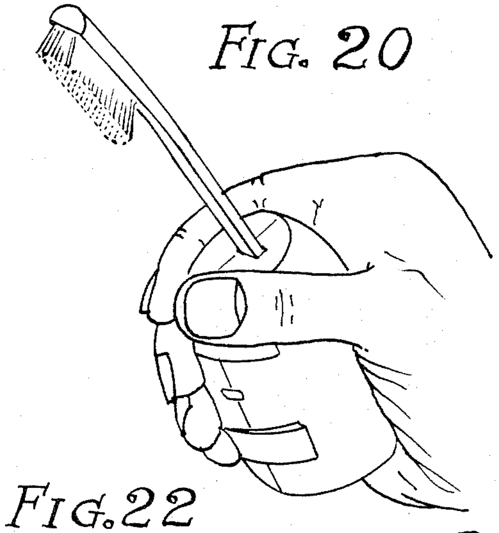
FIG. 20 illustrates the aid being used with a toothbrush.

Two identical channels 58 and 60 pass diagonally across the body as shown best in FIG. 7. The use of channel 60 is shown in FIG. 19 wherein the user has inserted a pencil into this channel. The purpose of the channel 58, the mirror image of channel 60, is in part to enable a person to put an instrument in a more upwardly directed orientation, but also to permit the aid to be used by a left-handed person upside down, so that the channel 58 would be used to write with a pencil as shown in FIG. 19 while maintaining the position of projections 48 between the finger tips and the heel of the hand. Thus, both left-handed and right-handed people can use the aid with the projections 48 away from the palm, rather than digging into it. These channels, as with the forwardly directed channel 62 discussed below, pass through the front region of the body, but do not pass through the skin 60 at the rear of the body. At this point, the surrounding skin supports the instrument, which may butt against the skin from the inside if the channel is not sufficiently narrow to frictionally engage it and prevent longitudinal movement.

Figure 22:
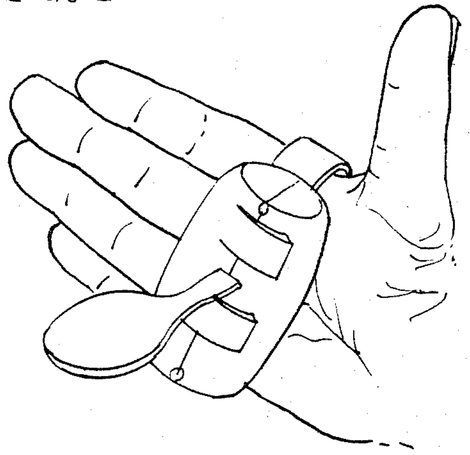
FIG. 22 shows the aid being used with the included palm strap when neither the fingers or the thumb are available for holding.

The forwardly directed channel 62 passes out between the latch straps as best shown in FIGS. 17 and 22. It is intended that this channel be especially adapted to engage the handle of an eating implement such as a fork or a spoon as shown, although undoubtedly other applications will be found. Naturally, the orientation about the longitudinal axis of the body need not be exactly as shown, but could be rotated one way or the other to adjust to personal preferences or limitations.

Figure 18:
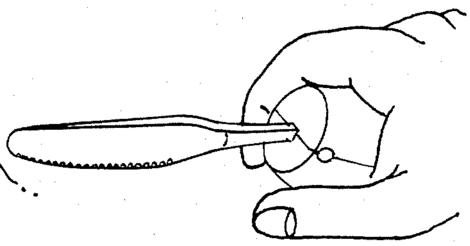
FIG. 18 shows the aid's ability to be used with a knife.

The last channel is a longitudinal channel 66, shown in use in FIG. 18 for holding a knife or toothbrush. Clearly, there will be other instruments that could be conveniently held in channel 66 in addition to a knife or toothbrush. This channel, unlike the others which have generally straight forward, oval-shaped channels, is dimensioned to hold a knife like shown in FIG. 18 in the arcuate cutaways 68, or, an object with a handle extending orthogonally to that shown in FIG. 18 could be engaged in the rectangular cutaway portion 70 of the channel.

Thus, the user of the instant invention is able to have an instrument projecting from his hand either generally perpendicular to his palm, at an upward or downward angle of about 30 degrees, or directly up or down through the use of the longitudinal channel 66. Because, as indicated above, rotation to any increment along the longitudinal axis is possible to fit individual preferences or limitations virtually any orientation of instrument can be achieved by the use of one of the channels of the gripping aid.

Figure 21:
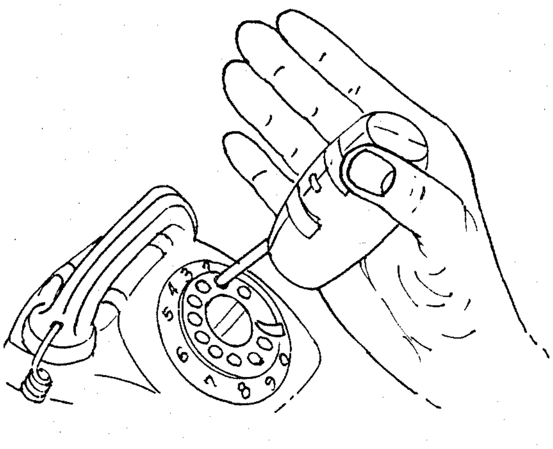
FIG. 21 shows the aid holding a reversed writing instrument used for phone dialing. It also shows how the aid can be used when only the thumb is available for holding.

The description thus far has hinged around the barrel-shaped body 20 and its channels, assuming that the arthritic has at least enough gripping dexterity to engage a large, barrel-shaped body of this nature with either the fingers as shown in FIG. 19, or with the thumb shown in FIG. 21. However, this is not always the case. In the event that the victim is missing some or all of his or her digits, or the hand is virtually totally paralyzed and cannot even grip a large object, a palm strap 72 is provided. This strap is shown in FIGS. 10 and 12, and has tabs 74 at each end, each having laterally projecting ears 76. The tabs extend into the slots 78 cut into the rear side of the body as shown in FIG. 7, with the ears 76 extending into the areas 80 between a pair of ribs. FIG. 14 illustrates the cross sectional shape of a typical slot half.

To attach the strap to the body, the tabs 74 are inserted into the slots 78 until the ears are in the areas 80 between the ribs, and the two half-shells are clamshelled closed. It should be noted that the ears are long enough that the half-shells may be opened sufficiently to insert or remove a pen, fork or other instrument, without dislodging the palm strap, so it may be left on semi-permanently, during a period in which the half-shells may be opened repeatedly, hundreds of times, to remove and insert different instruments.

Use of the palm strap is shown in FIG. 22, and of course it could be used for any of the other operations illustrated in FIGS. 17 through 21. The only difference in flexibility and utility lies in the fact that with the palm strip, naturally the rotation of the body about the longitudinal axis to achieve different angular orientations of the instrument in use is somewhat limited.

Thus, the invention is a versatile, simple, easy to mass produce aid, which should prove a blessing to anyone who is manually or digitally handicapped. Aside from the ambulatory use of the legs, the use of the hands is probably the most important faculty that an arthritis victim needs, and, virtually irrespective of the severity of the paralysis of the hand joints, the instant invention should be usable, as shown, to free the arthritic virtually completely from outside help in the performance of these simple, manual functions. In many cases the need for institutionalization, with its tremendous dollar costs to the state and the individual, as well as the non-monetary cost to the individual's self-respect, will be eliminated with the use of the instant invention.

What is claimed is:

1. A grasping aid for a person having a manual/digital disability comprising:

(a) a generally palm-sized, body shaped and dimensioned to be grasped in the palm of the hand;

(b) said body being longitudinally split into a pair of half-shells hinged at one edge to clamshell together into mated relation defining a mating plane generally bisecting said body;

(c) at least one elongated channel lying generally along said plane and opening through the perimeter of said body;

(d) said body being resilient at least in those portions defining said channel, whereby implements having handles at least slightly oversized in cross-section can be gripped in said channel, whereby a person with a manual/digital disability who would have trouble grasping said instrument directly can nevertheless engage said instrument in said channel by clam shelling said half-shells together, and grasping said body.

2. Structure according to claim 1 wherein said body defines a plurality of elongated channels entered therein at a plurality of different angles.

3. Structure according to claim 1 wherein said body is barrel-shaped and split into said half-shells along a plane substantially passing through the barrel axis, and said half shells are hinged adjacent one side of the barrel-shaped body which is defined as the rear side of the barrel, which seats against the palm of the hand in use.

4. Structure according to claim 3 and including means to latch said half-shells together while clamping an instrument therebetween, said latch means being provided on said body on the front side thereof, opposite the rear side, said latch means comprising at least one latch strap extending from a first one of said half shells around the second one of said half-shells, the second one of said half shells defining an opening having sidewalls and a rim, and including a nib on the distal end of said latch strap, said nib having a notch on the side thereof proximate the strap and a flat head on the side thereof opposite said notch, said nib being engagable on the rim of said opening with said flat head butted up against a rear sidewall of said opening, such that tension on said strap causes said notch to grip the rim of said opening, and said flat head butted up against said wall prevents said nib from rotating to free said notch from the rim of said opening.

5. Structure according to claim 4 wherein said latch strap lies substantially within the projected contours of said body, and including at the distal end thereof a detent release projection on the back side of said nib and having a substantial radial component extending outside the projected contour of said body to permit the quick release of said detent by flipping same out of said opening by pushing said projection.

6. Structure according to claim 5 wherein said latch strap and opening are duplicated and are longitudinally spaced on said body.

7. Structure according to claim 3 wherein said half shells substantially meet along a rear junction line and the hinge means hinging said half shells together comprises at least one flexible hinge strap, the ends of which connect to the respective half shells at points spaced from said junction line to provide a relatively large radius of curvature for said hinge strap when said half shells are open.

8. Structure according to claim 7 wherein said hinge means comprises a pair of longitudinally spaced hinge straps sunk into said body so as not to extend above the projected surface of said body when said half shells are closed.

9. Structure according to claim 8 wherein said two half shells and hinges are molded as a single piece.

10. Structure according to claim 9 wherein said entire grasping aid is molded as a single piece.

11. Structure according to claim 3 wherein said half-shells are each defined as an external skin with a series of internal reticulated ribs, the entire grasping aid being constituted of a uniform resilient material such that said ribs will yield to conform to a grasped implement, and the half-shells will bow outwardly if necessary to accomodate a relatively large-handled implement.

12. Structure according to claim 1 wherein said body has a longitudinal axis and a plurality of channels passing through said body, at least two of said channels being provided as a pair extending symmetrically about a plane which is normal to said axis and substantially bissecting said body, such that said body can be turned upside down and provide the same channel orientations to a left handed user as provided a right handed user when the body is maintained right side up.

13. Structure according to claim 1 wherein in use said body defines a rear side to seat against the palm, a front side opposite the rear side, a top end adjacent the thumb and forefinger, and a bottom end opposite the top end, and defines instrument-gripping channels extending out the bottom end and front side to accomodate various instruments at the various angles required for their proper use.

14. Structure according to claim 13 and including a further channel substantially bissecting the angle between the firt mentioned two channels.

15. Structure according to claim 13 and further including a longitudinally oriented channel extending out one end of said body.

16. A method of gripping an instrument by a person having a manual/digital grasping disability using a body comprised of two hinged halves which clam shell together and latch, said method comprising the following steps:

(a) clam shelling said halves together around an instrument and latching same together;

(b) grasping said body with the hand.

* * * * *